United States Patent
Brinkhuis et al.

(10) Patent No.: US 9,284,423 B2
(45) Date of Patent: *Mar. 15, 2016

(54) CROSSLINKABLE COMPOSITION CROSSLINKABLE BY REAL MICHAEL ADDITION (RMA) REACTION

(71) Applicant: NUPLEX RESINS B.V., Bergen Op Zoom (NL)

(72) Inventors: Richard Hendrikus Gerrit Brinkhuis, Zwolle (NL); Antonius Johannes Wilhelmus Buser, Wehl (NL); Petrus Johannes Maria David Elfrink, Boxmeer (NL); Ferry Ludovicus Thys, Stevens-Woluwe (BE); Elwin Aloysius Cornelius Adrianus De Wolf, Hoogerheide (NL)

(73) Assignee: Nuplex Resins B.V., Bergen op Zoom (NL)

( * ) Notice: Subject to any disclaimer, the term of this patent is extended or adjusted under 35 U.S.C. 154(b) by 37 days.

This patent is subject to a terminal disclaimer.

(21) Appl. No.: 14/246,306

(22) Filed: Apr. 7, 2014

(65) Prior Publication Data

US 2014/0235785 A1    Aug. 21, 2014

Related U.S. Application Data

(63) Continuation of application No. PCT/EP2012/069905, filed on Oct. 8, 2012.

(30) Foreign Application Priority Data

Oct. 7, 2011 (EP) .................................. 11184426

(51) Int. Cl.
*C08J 3/24* (2006.01)
*C09D 7/12* (2006.01)
*B01J 31/02* (2006.01)

(52) U.S. Cl.
CPC ............... *C08J 3/24* (2013.01); *B01J 31/0205* (2013.01); *B01J 31/0239* (2013.01); *B01J 31/0268* (2013.01); *C09D 7/125* (2013.01); *B01J 2231/341* (2013.01)

(58) Field of Classification Search
CPC .................................. C08J 3/24; C09D 7/125
USPC .................................................. 524/379, 539
See application file for complete search history.

(56) References Cited

U.S. PATENT DOCUMENTS

| | | | |
|---|---|---|---|
| 2013/0053505 A1* | 2/2013 | Brinkhuis et al. | 524/539 |
| 2013/0210986 A1* | 8/2013 | Brinkhuis et al. | 524/391 |
| 2014/0221542 A1* | 8/2014 | Brinkhuis et al. | 524/389 |
| 2014/0228507 A1* | 8/2014 | Brinkhuis et al. | 524/539 |

FOREIGN PATENT DOCUMENTS

| | | |
|---|---|---|
| CN | 1723242 A | 1/2006 |
| CN | 102834437 A | 12/2012 |
| EP | 0808860 A2 | 5/1997 |
| EP | 2374836 A1 | 10/2011 |
| JP | 01204919 A | 8/1989 |
| JP | 2002285100 A | 10/2002 |
| WO | 2004035632 A2 | 4/2004 |
| WO | 2008157468 A1 | 12/2008 |
| WO | 2011124663 A1 | 10/2011 |
| WO | 2011124665 A1 | 10/2011 |

OTHER PUBLICATIONS

T. Jung et al.—Farbe und Lacke Oct. 2003.
The International Search Report of PCT/EP2012/069905.

* cited by examiner

*Primary Examiner* — Edward Cain
(74) *Attorney, Agent, or Firm* — Ramin Amirsehhi; David P. Owen; Hoyng Rokh Monegier LLP

(57) ABSTRACT

A crosslinkable composition including a component A with at least 2 acidic protons C—H in activated methylene or methine groups (the RMA donor group), and a component B with at least 2 activated unsaturated groups (the RMA acceptor group), and a catalyst system C that contains, or is able to generate a basic catalyst capable of activating the RMA reaction between components A and B, characterised in that the cross-linkable composition further includes an X—H group containing component D that is also a Michael addition donor reactable with component B under the action of catalyst C, wherein X is N, P, O, S or wherein X is C as part of an acidic methyl (CH3) group. A component D and catalyst additive mixtures for the manufacture of RMA crosslinkable composition.

29 Claims, 4 Drawing Sheets

Appendix: Photographs of cured coatings
Fig. 2
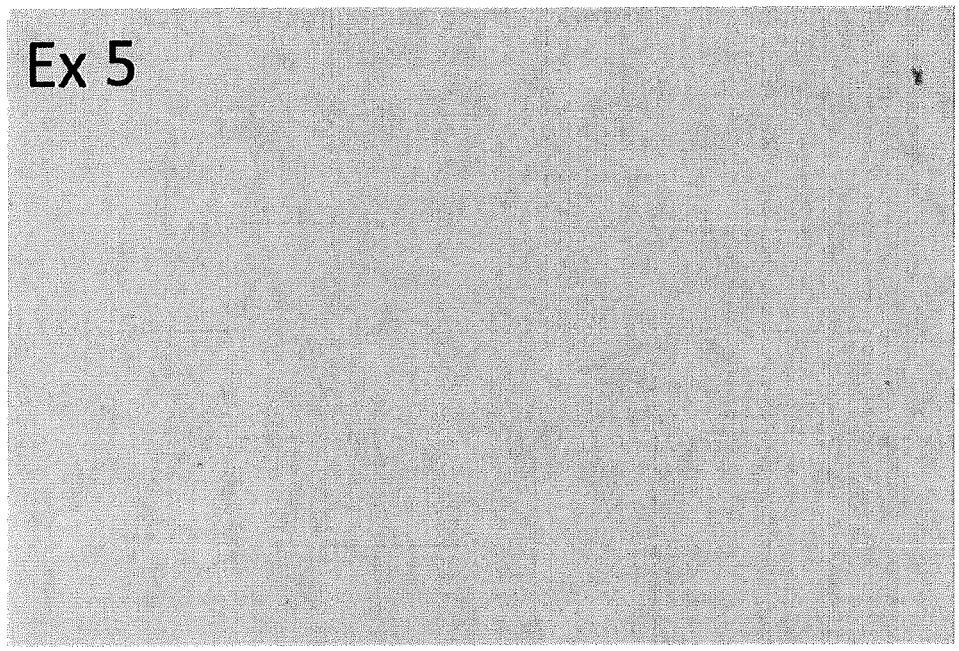
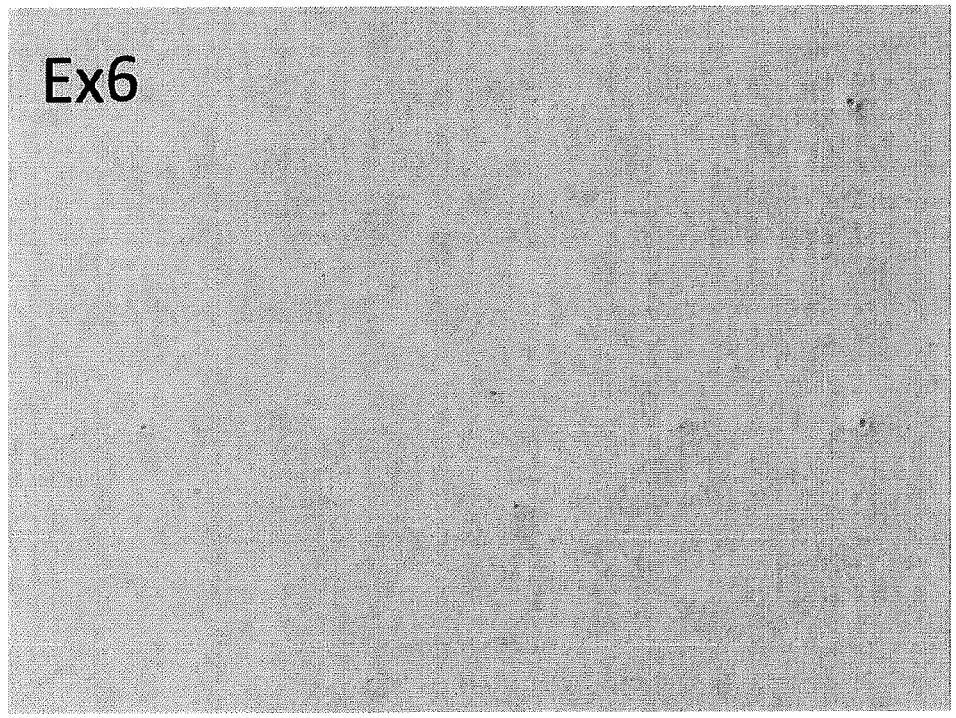
Fig. 3

Fig.4
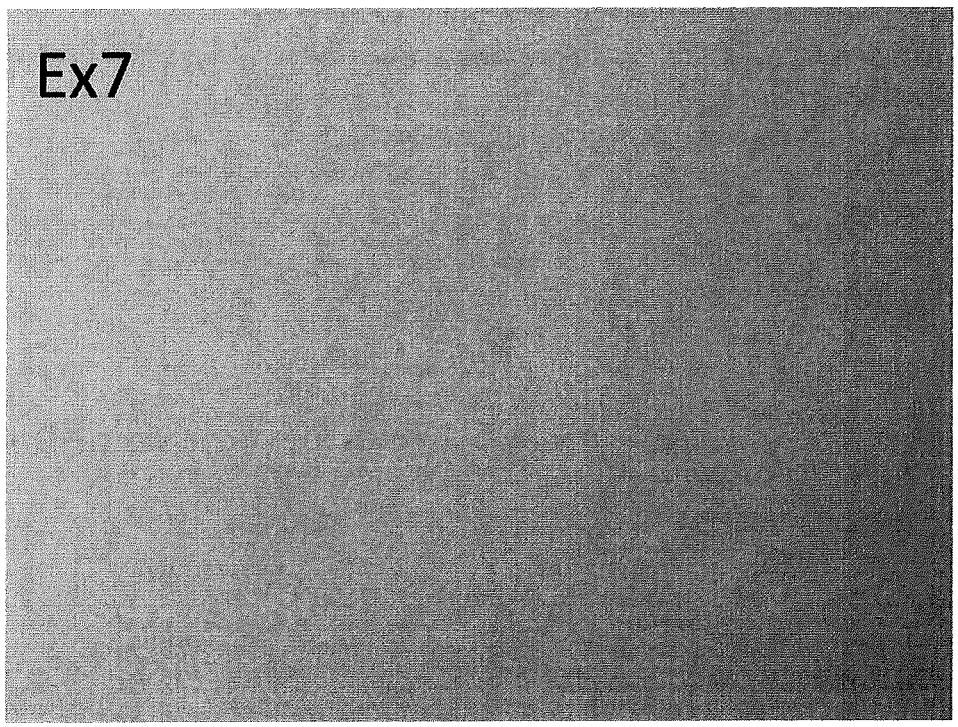
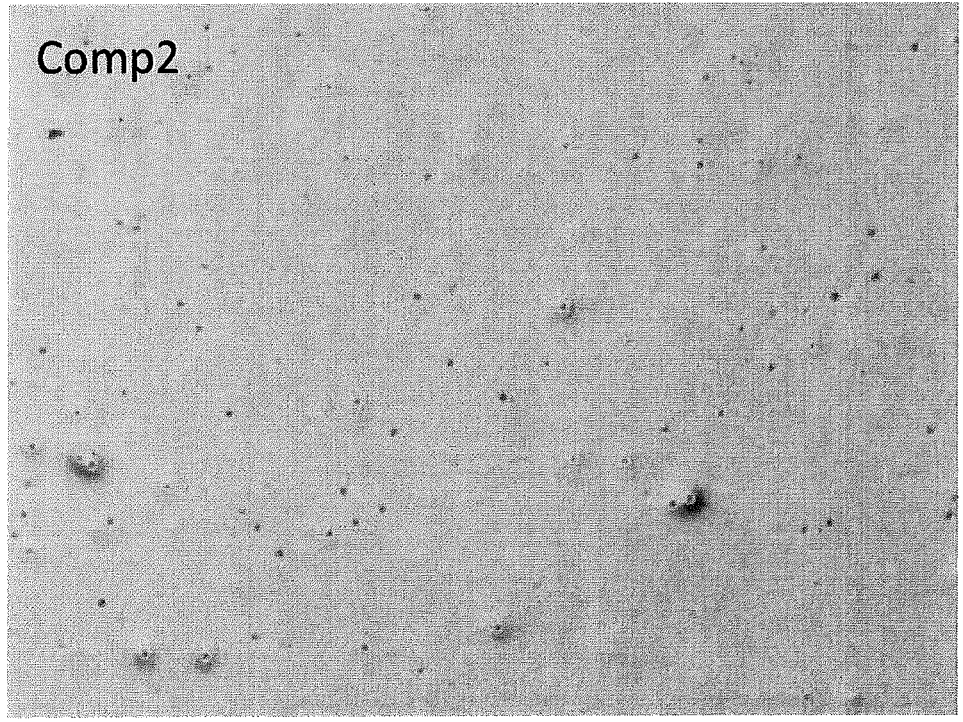
Fig.5

CROSSLINKABLE COMPOSITION CROSSLINKABLE BY REAL MICHAEL ADDITION (RMA) REACTION

CROSS REFERENCE TO RELATED APPLICATIONS

This application is a continuation of PCT application number PCT/EP2012/069905 filed on 8 Oct. 2012, which claims priority from European application number 11184426.2 filed on 7 Oct. 2011. Both applications are hereby incorporated by reference in their entireties.

BACKGROUND OF THE INVENTION

1. Field of the Invention

The present invention relates to a crosslinkable composition crosslinkable by Real Michael Addition (RMA) reaction wherein a component with at least 2 activated unsaturated groups (hereafter also referred to as the RMA acceptor) and a component with at least 2 acidic protons C—H in activated methylene or methine groups (hereafter also referred to as the RMA donor) react and crosslink to each other in the presence of a strong base catalyst.

2. Description of the Related Art

RMA chemistry can be tuned to give fast curing compositions (also at lower curing temperatures) in coating compositions at acceptable or good pot lives and good material properties, which makes this chemistry very attractive as a basis for coating compositions. Details of RMA cross-linkable compositions using a latent based crosslinkable catalyst are described in PCT/EP2011/055463 which is herewith incorporated by reference.

Real Michael Addition is activated by strong bases, but also inhibited by the presence of acidic species that will consume these basic catalysts. In tuning the reactivity of coating systems in view of achieving a desirable drying profile, there are various requirements to balance. The drying profile (also referred to as the reaction profile or as the curing profile) is the progress of the crosslinkable reaction as a function of time. It is required that the drying profile allows build-up of mechanical properties as fast as possible, to help the productivity of the coater. It is further also required to have a drying profile that is robust, i.e. the reactivity (and hence the resulting drying profile) is not strongly influenced by accidental low levels of acidic contaminants being present.

On the other hand it is required to have a good appearance of the resulting coating. This implies the need for sufficient levelling during the immediate period after application, when the curing coating composition is present as a liquid and capable of such levelling. This also implies the need for absence of artefacts like solvent inclusions or gas inclusions or other surface irregularities that may occur if curing is very fast, especially if it is faster at the surface than in deeper layers, which is often the case if curing occurs at the time scale of solvent evaporation or surface activation of a catalyst. Also film hardness build-up will be affected under conditions in which solvent entrapment occurs.

The described requirements are to some extent opposing each other. For a fast curing profile, but also for a high robustness against accidental acid contaminants reasonably high levels of catalyst are preferred, whereas at the same time such high levels of catalysts may negatively influence surface appearance and hardness development as described above. The object of the invention is to provide an RMA crosslinkable composition that provides a better balance in these apparently counteracting requirements in particular in crosslinkable compositions having a high solid content.

BRIEF SUMMARY OF THE INVENTION

There is also a desire for crosslinkable compositions that can be simply cured in ambient conditions as opposed to for example compositions comprising photo-latent amine catalysts, known from T. Jung et al Farbe and Lacke October 2003. Such photo-latent amine catalysts that do generate a strong base on UV radiation, are not suitable for coating more complex irregular substrates where parts of the surfaces are not reachable with UV or visible light, or for highly pigmented systems.

BRIEF DESCRIPTION OF THE DRAWINGS

The features and advantages of the invention will be appreciated upon reference to the following drawings, in which:

FIGS. 2 to 7 are microscope pictures of the cured coatings on panels at approximately 100 mu dry film thickness.

DESCRIPTION OF ILLUSTRATIVE EMBODIMENTS

The following is a description of certain embodiments of the invention, given by way of example only and with reference to the figures.

According to the invention at least one of the aforementioned problems has been overcome by a crosslinkable composition comprising a. a component A with at least 2 acidic protons C—H in activated methylene or methine groups (the RMA donor group), and
b. a component B with at least 2 activated unsaturated groups (the RMA acceptor group), and
c. a catalyst system C that contains, or is able to generate a basic catalyst capable of activating the RMA reaction between components A and B,
d. characterised in that the cross-linkable composition further comprises an X—H group containing component D that is also a Michael addition donor reactable with component B under the action of catalyst C, wherein X is N, P, O, S or wherein X is C as part of an acidic methyl (CH$_3$) group.

In a preferred crosslinkable composition according the invention the RMA acceptor groups B are acryloyl groups and preferably the RMA donor groups A predominantly are malonate groups. Typically, at least one of the components A and B are in the form of a polymer, for example a polyester containing malonate groups. Preferably, catalyst C is a carbonate salt according to formula X$^+$ROCO$_2^-$, wherein X$^+$ is a non-acidic cation, preferably quaternary ammonium or phosphonium, and R is hydrogen or a substituted or unsubstituted alkyl, aryl, or aralkyl group.

The inventors have found that by using X—H group containing component D as described, preferably those wherein X is N, P or C as part of an acidic methyl (CH3) group, it is possible to create a reactivity profile comprising an initial induction time of lowered reaction rate directly after application and activation of the system, followed by a relative increase of reactivity in later stages. This induction time can be tuned, to allow an "open time", a period allowing flow and solvent and entrapped air bubbles to escape, to be prolonged.

The induction time allows a significantly higher amount of flow and levelling of the system, avoiding surface defects that may result from very fast cure without these additives, and better hardness build-up due to reduced solvent entrapment, while still benefiting from the full potential of the catalysts beyond this induction time, thus creating an acceleration of the reaction at later stages to complete crosslinking at higher rate than would be found if simply using lower catalyst levels. Also the high sensitivity of lower catalyst levels towards accidentally present acid contaminations is avoided.

Figure 1:
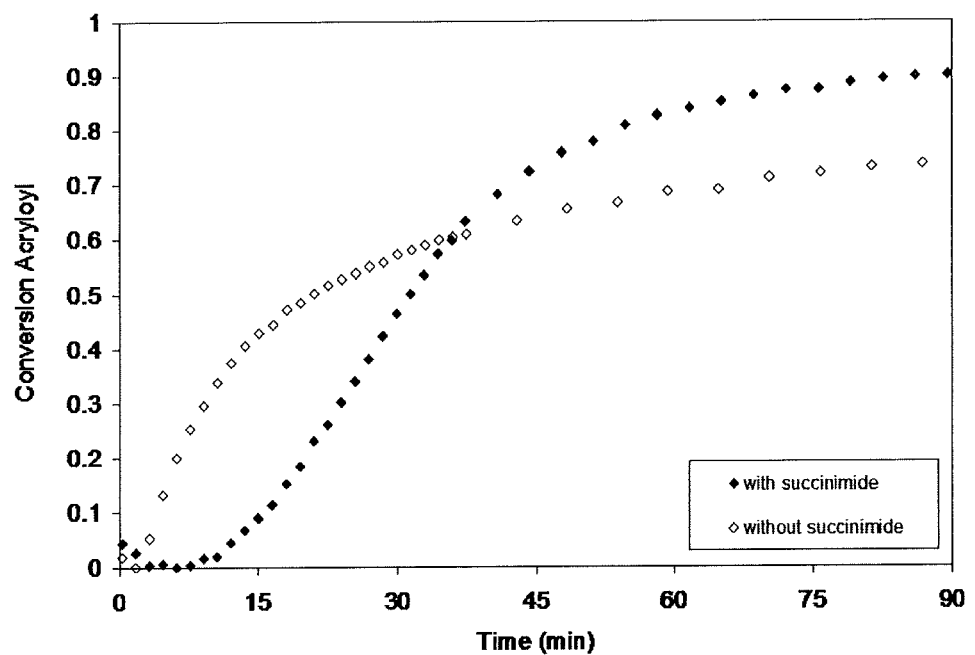
FIG. 1 illustrates the conversion of the acryloyl (as followed by FTIR at 809 cm$^{-1}$) in the preferred acryloyl/malonate system using succinimid as component D.
Figure 6:
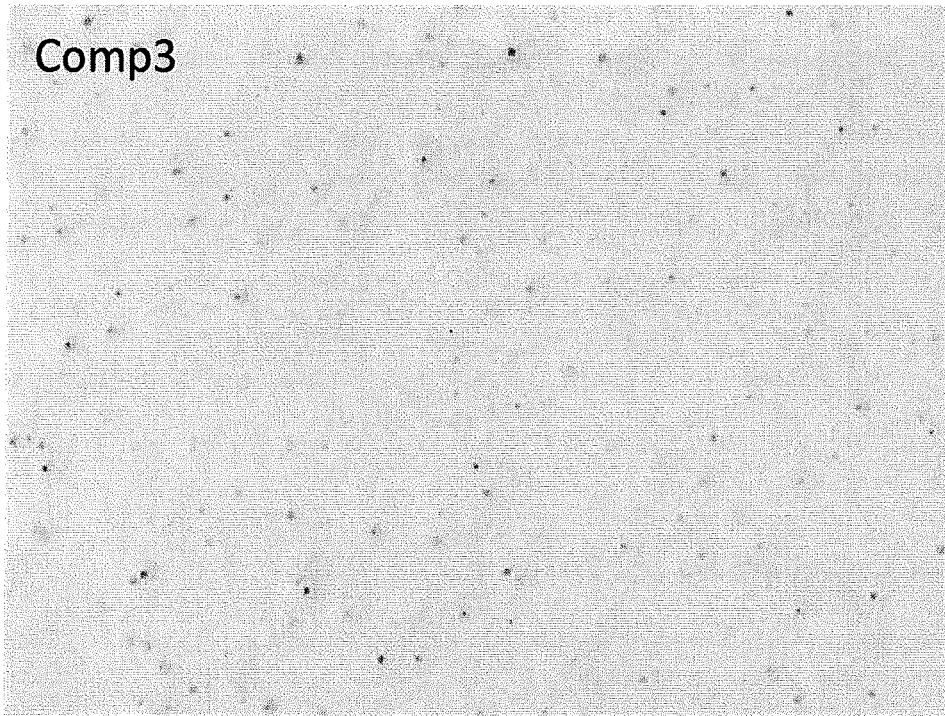
Figure 7:
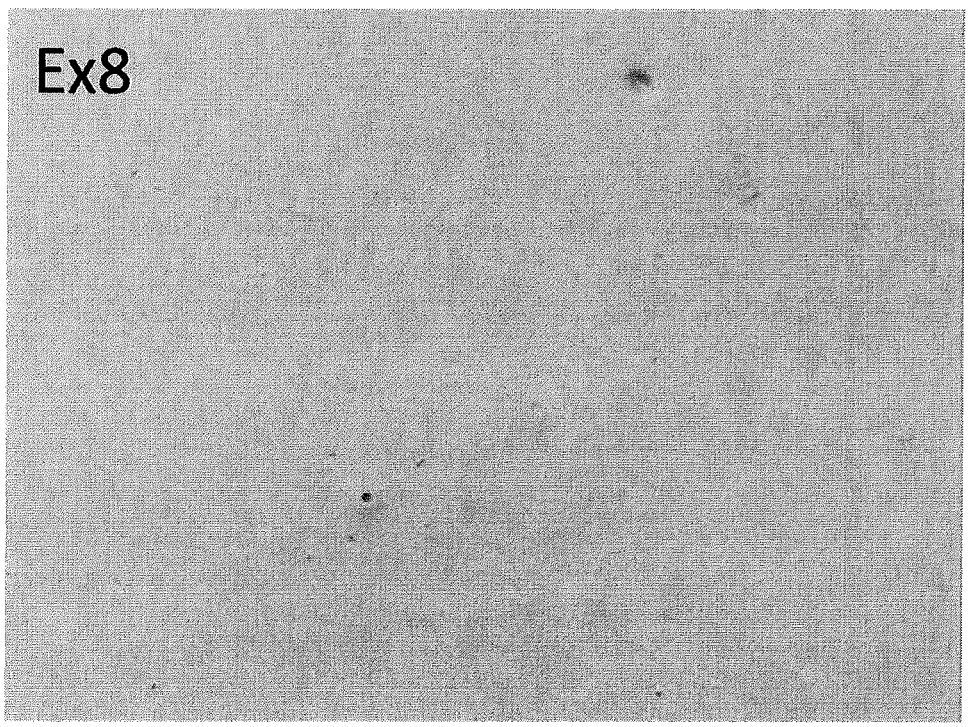

The effect obtained according to the invention is illustrated in FIG. 1 which describes the conversion of the acryloyl (as followed by FTIR at 809 cm-1) in the preferred acryloyl/malonate system using succinimid as component D. The crosslinkable composition without component D has a very quick hardness build up (open diamonds). The profile of the same composition with component D (closed diamond) shows that the open time modifying component D creates an induction time in the reactivity profile in which the conversion is slowed down and after which the conversion accelerates to give fast cure completion. This effect cannot simply be obtained by choosing a lower amount of catalyst C.

The components in the crosslinkable composition form an acid-base equilibrium system. The reactivity profile of the crosslinkable composition is the result of the choice of relative pKa values of the acidic components A and D in the composition that contribute to the acid-base equilibrium system and the relative reactivity of the deprotonated forms of the components towards component B. A list of Pka values of suitable components D or A2:

| | |
|---|---|
| succinimide | 9.5 |
| ethosuximide | 9.3 |
| 5,5-dimethylhydantoin | 10.2 |
| 1,2,4-triazole | 10.2 |
| 1,2,3-triazole | 9.4 |
| benzotriazole | 8.2 |
| benzenesulfonamide | 10.1 |
| nitromethane | 10.2 |
| isatine | 10.3 |
| uracil | 9.9 |
| 4-nitro-2-methylimidazole | 9.6 |
| phenol | 10.0 |
| ethylacetoacetate | 10.7 |
| acetylacetone | 9.0 |
| diethylmalonate | 13.0 |

The X—H group in component D has a higher acidity than the C—H groups in component A, preferably being characterized in that component D has a pKa (defined in aqueous environment) of at least one unit, preferably two units, less than that of component A. Preferably the pKa of the X—H group in component D is lower than 13, preferable lower than 12, more preferably lower than 11 most preferably lower than 10. An excessive acidity may create problems with components in the catalyst system; therefore hence the pKa is preferably higher than 7, more preferably 8. The acidity difference assures that on application of the coating, component D is activated (deprotonated) preferentially over component A.

It is preferred that component D has a reactivity in a Michael addition towards component B such that, when present in a mixture alongside the C—H functional groups of component A and a base catalyst, it will convert relatively faster, compared to the C—H of component A. This preference of D converting faster than A helps creating an induction time. Such a preference can be established by formulation both components A and D (or model compounds with similar functional groups) in similar amounts, with a limited amount of a component with similar functional groups as component B (e.g. butylacrylate, such that the amount of RMA donor groups to RMA acceptor groups is 2 to 1), and completing the Michael addition in the presence of a base, and analyzing the results with a suitable technique, e.g with LC or NMR. The conditions (e.g. temperature) are then best chosen close to the conditions to used in curing. As a first guideline, this can done under room temperature conditions. In this context it is noted that the Michael-Addition proceeds through reaction of the X—H moiety and not through some independent other moiety somewhere else in the molecule. However, in some instances like for example phenol, the proton abstraction from the X—H moiety may be followed by an electronic rearrangement resulting in that the component D is bonded at a different part of the molecule.

It is further preferred that component D has a reactivity towards a Michael addition when activated with a base, which is lower by at least a factor 3, preferably at least 10, more preferably at least 30, compared to that of the C—H groups in component A, when either is tested under comparable conditions in a formulation at room temperature with excess of RMA acceptor groups B, and in presence of a base at least able to deprotonate 1 mole % of the RMA donor. The lower reactivity of D anions towards B compared to that of A anions, helps creating an induction time. When considering its application for other curing temperatures, this relative reactivity is best determined at adjusted temperatures.

The catalyst C is mixed with components A and B shortly before use. Components A and B are usually stored together and should have a long shelf life. Component D can be mixed and stored with catalyst C or with components A and B. In particular in the latter case, in view of maintaining acceptable pot life and shelf life, it is preferred that the X—H group of component D is not too highly reactive towards the Component B (eg acryloyl) in absence of the base catalyst C; ie without activation by a base. Therefore, it is preferred that the component D has a reactivity in a Michael addition towards component B such that, without base activation, it has a room-temperature half-time when dissolved in butylacrylate of more than 30 minutes, preferably more than 1 hour, preferably more than 2 hours, preferably more than 4 hours, more preferably more than 8 hours, still more preferably more than 24 hours, most preferably more than 72 hours.

In the crosslinkable composition the X—H groups in component D are preferably present in an amount corresponding to at least 50 mole %, preferable at least 100 mole %, most preferably at least 150 mole % relative to the amount of base to be generated by catalyst C. Further, the X—H groups in component D are preferably present in an amount corresponding to no more than 30 mole %, preferably no more than 20 mole % relative to C—H donor groups from component A.

Suitable components D are X—H group containing component D wherein the X is C as part of an acidic methyl ($CH_3$) group, preferably nitromethane. Other suitable X—H group containing component D or components wherein the X is O, preferably a hydroxyl aromatic compound.

Preferred components D are an aza-acidic compounds (X is N) preferably comprising a molecule containing the N—H as part of a group Ar—NH—(C=O)—, —(C=O)—NH—(C=O)—, or of a group —NH—(O=S=O)— or a heterocycle in which the nitrogen of the N—H group is contained in a heterocyclic ring, more preferably component D is an imide derivative, preferably cyclic, preferably an (optionally substituted) succinimide or glutarimide. A suitable example of substituted succinimide is ethosuximide.

Other suitable components D wherein X is N are hydantoin derivatives, for example 5,5-dimethylhydrantoin, sulfonamides, for example aromatic sulfonamides as benzene- or toluenesulfonamide or components D being a N—H group containing heterocycle, preferably a substituted or unsubstituted triazole, pyrazole or imidazole, preferably 1,2,4-triazole, benzotriazole or 2-methyl-4-nitroimidazole or a uracil derivative.

In the crosslinkable composition, the X—H groups in component D are present in an amount corresponding to at least 50 mole %, preferable at least 100 mole %, most preferably at least 150 mole % relative to the amount of base to be generated by catalyst C. The appropriate amount is very much determined by the acid base characteristics of component D relative to component A, and the reactivity of the corresponding anions relative to B, so may vary for different systems. It is noted that the open time improving effect can in some cases be obtained at very small amounts of component D, which is very advantageous because such small amounts do not or not significantly affect the properties of the resulting cured composition; for example the chemical and mechanical properties of a coating. Typically the X—H groups in component D are present in an amount corresponding to no more than 30 mole %, preferably no more than 20 relative to C—H donor groups from component A.

It should be noted that component D may be present in its deprotonated form (in acid base equilibrium with other components). Amounts for component D referred to include both the neutral as well as the deprotonated form. This implies that if present in amounts of more than 100% relative to a base catalyst C, components C and D may be in equilibrium such that effectively the deprotonated form of D is present as the dominant species to initiate further RMA cure (rather then coexist as basic (C) and acidic (D) species in the formulation). Preferably, the X—H functionality (number of groups per molecule) of component D is low, preferably less than 4, more preferably less than 2, most preferably it is 1.

The crosslinkable composition may comprise next to one or more different components D a component A2 comprising acidic protons (C—H) in activated methylene or methine groups having a higher acidity than component A and which are also is reactive towards component B. Such component A2 can also contribute to the open time improving effect, however in order to have a significant effect A2 should be typically be present in an amount between 10-40 wt %, which is a significantly higher amount than for component D. In the crosslinkable composition the C—H groups in component A2 are present in an amount between 1 and 50 mol % preferably 5-40 mol % (to total C—H in RMA donor A)

Components A2 preferably have a structure according to formula 2:

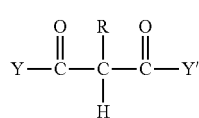

Formula 1 wherein R is hydrogen or an alkyl, aralkyl or aryl substituent and Y and Y' are same or different substituent groups, preferably alkyl, aralkyl or aryl (R*), alkoxy (—OR*) or a polymer backbone or wherein the —C(=O)—Y and/or —C(=O)—Y' is replaced by CN or phenyl.

The difference in acidity of the two C—H acidic components A and A2 is chosen preferably in that the pKa of component A2 is between 0.5 and 6, preferably between 1 and 5 and more preferably between 1.5 and 4 units lower than the pKa of component A. Preferably, component A is a malonate containing component and component A2 is an acetoacetate or acetylacetone containing component, preferably of low C—H functionality (preferably less than 10, more preferably less than 5, most preferably it is no more than 2).

In a preferred embodiment the cross-linkable composition comprises a RMA additive mixture comprising:
  a. one or more components selected from the group of substituted or unsubstituted triazoles and of components A2, preferably a benzotriazole, acetoacetate or acetylacetone, and additionally
  b. one or more components selected from the group of non-triazole components D, preferably N—H acidic compounds, most preferably a succinimide.

In another embodiment, the crosslinkable composition comprises a RMA additive mixture comprising three different additives:
  a. one or more components selected from the group of substituted or unsubstituted triazoles (including benzotriazole) and
  b. one or more components components A2, and additionally
  c. one or more components selected from the group of non-triazole components D.

It was found that additives listed in above-mentioned types a.-c. have a somewhat different effect on the cross-linking reaction kinetics and may be used in combination to optimize the curing cross-linking reaction, for example in view of specific applications (paint formulations) or specific application process conditions or coating requirements. We have observed that especially components of type a and b strongly improve appearance at higher film thicknesses, whereas components of type c have a more pronounced effect on hardness build-up.

The invention therefore also relates to an RMA coating additive mixture comprising at least 2 different additives
  a. one or more components selected from the group of components A2 comprising C—H acidic protons in activated methylene or methine groups, preferably acetoacetate or acetylacetone, and of substituted or unsubstituted triazoles components, preferably triazole or benzotriazole, and additionally
  b. one or more components selected from the group of non-triazole X—H group containing components D wherein X is N, P, O or S or wherein X is C as part of an acidic methyl (CH3) group, preferably N—H containing components D, most preferably a succinimide.

In another embodiment the invention relates to such RMA coating additive mixture comprising at least 3 different additives;
  a. one or more components A2, preferably acetoacetate or acetylacetone, and additionally
  b. one or more components selected from the group of substituted or unsubstituted triazoles, preferably benzotriazoles or triazoles, and
  c. one or more components selected from the group of non-triazole components D.

In said RMA coating additive mixture the pKa of the X—H group in component D is preferably between 7 and 13, preferably lower than 12, more preferably lower than 11, most preferably lower than 10; and preferably higher than 7, more preferably 8.

The invention also relates to the use of component D or of the above described RMA coating additive mixtures for the improvement of the appearance and hardness of a cured coating made of a RMA crosslinkable composition comprising a component A with at least 2 acidic protons C—H in activated methylene or methine groups (the RMA donor group), and a component B with at least 2 activated unsaturated groups (the RMA acceptor group) and a cross-linking catalyst C, preferably a latent base carbonate salt as herein described, wherein said additive components are also a Michael addition donor groups reactable with a component B and wherein the X—H group of component D preferably has a pKa (defined in aqueous environment) of at least one unit, preferably two units, less than that of the C—H groups in component A.

Component A

Suitable examples of components A containing activated methylene or methine groups are well known in the art. Preferred are the oligomeric and/or polymeric A group containing components such as, for example, polyesters, polyurethanes, polyacrylates, epoxy resins, polyamides and polyvinyl resins containing groups A in the main chain, pendant or both.

Component A preferably is malonate or acetoacetate. Components containing both malonate and acetoacetate groups in the same molecule are also suitable. Additionally, physical mixtures of malonate and acetoacetate group-containing components are suitable.

In a most preferred embodiment of the crosslinkable composition, component A is a malonate containing compound. It is preferred that in the crosslinkable composition the majority of the activated C—H groups are from malonate, that is more than 50%, preferably more than 60%, more preferably more than 70%, most preferably more than 80% of all activated C—H groups in the crosslinkable composition are from malonate and preferably more than 50%, 60, 70 and more preferably more than 80% of the components A in a polymer are malonate groups.

In another embodiment, the crosslinking composition comprises a component A, for example a polymer, wherein more than 50%, preferably more than 70%, more preferably more than 80% and most preferably more than 90% of the activated C—H groups are from malonate and a separate component, for example another polymer, oligomer or monomer, comprising activated C—H groups not from malonate, for example acetoacetate.

Especially preferred malonate group-containing components for use with the present invention are the malonate group-containing oligomeric or polymeric esters, ethers, urethanes and epoxy esters containing 1-50, more preferably 2-10, malonate groups per molecule. In practice polyesters and polyurethanes are preferred. It is also preferred that such malonate group-containing components have a number average molecular weight (Mn) in the range of from about 100 to about 5000, more preferably, 250-2500, and an acid number of about 2 or preferably less. Also monomalonates can be used as they have 2 reactive C—H per molecule. Monomeric malonates can, in addition, be used as reactive diluents.

Component B

Components B generally can be ethylenically unsaturated components in which the carbon-carbon double bond is activated by an electron-withdrawing group, e.g. a carbonyl group in the alpha-position. Suitable components B are known in the art, for example (meth-)acryloyl esters, (meth-)acrylamides, alternatively polyesters based upon maleic, fumaric and/or itaconic acid (and maleic and itaconic anhydride and polyesters, polyurethanes, polyethers and/or alkyd resins containing pendant activated unsaturated groups. Acrylates, fumarates and maleates are preferred. Most preferably, the component B is an unsaturated acryloyl functional component.

It is also especially preferred that the acid value of the activated unsaturated group-containing components (as of any of other component used in the composition) is sufficiently low to not substantially impair activity of the catalyst, so preferably less than about 2, most preferably less than 1 mg KOH/g. As exemplified by the previously incorporated references, these and other activated unsaturated group-containing components, and their methods of production, are generally known to those skilled in the art, and need no further explanation here. Preferably the functionality is 2-20, the equivalent weight (EQW: average molecular weight per reactive functional group) is 100-2000, and the number average molecular weight preferably is Mn 200-5000.

The advantages of the invention are particularly manifest in critically difficult compositions comprising not only a high solids content but also aimed at a high crosslinking density, with relative high concentrations and functionalities of functional groups, for example in case the component A is a compound, in particular an oligomer or polymer, comprising an average of 2 to 30, preferably 4 to 20 and more preferably 4-10 activated C—H per polymer chain.

It is also possible that component A and B are present in hybrid molecules containing both types of functional groups.

Typically, the concentrations of the functional groups in components A and B, and their relative stoichiometry, are chosen such that good film properties following cure may be expected, with efficient use of these functional groups. Typically, stoichiometries C—H/C=C are chosen o be from 0.1 to 10, preferably 0.5 to 3, more preferably 0.7 to 3, most preferably 0.8/1.5. For this ratio, the X—H of component D is added to the C—H groups of component A.

Component C

The base catalyst C can in principle be any known catalyst suitable for catalyzing RMA reactions. Preferably, in view of achieving good pot-life in combination with low temperature curing, the crosslinkable composition comprises a catalyst system C comprising a strong based blocked by a volatile acid which is activated by evaporation of this acid. A suitable catalyst system C comprises a strong base blocked by a carbon dioxide, or the blocked catalytic species are of formula ROCO2-, R being an optionally substituted alkyl, preferably C1-C4 radical or hydrogen, preferably the catalyst comprises a blocked base anion and a non-acidic cation, preferably a quaternary ammonium or phosphonium cation. Suitable catalysts C are described in PCT/EP2011/055463 herewith incorporated by reference. It is preferred that the crosslinking catalyst is utilized in an amount ranging between 0.001 and 0.3 meq/g solids, preferably between 0.01 and 0.2 meq/g solids, more preferably between 0.02 and 0.1 meq/g solids (meq/g solids defined as mmoles base relative to the total dry weight of the crosslinkable composition, not counting particulate fillers or pigments). Alternatively, the catalyst system C is activated by reaction of an epoxy component with a tertiary amine, or an anion.

For the CO2 deblocking catalyst systems, it was surprisingly found that significantly better potlife could be achieved in a composition wherein component A is a malonate, which composition further comprises 0.1-10 wt %, preferably 0.1-5, more preferably 0.2-3 and most preferably 0.5-2 wt % water (relative to total weight of the coating composition). Preferably, the amount of water is chosen in an effective amount to increase gel time with at least 15 minutes, preferably at least 30 min, more preferably at least 1 h, even more preferably at least 5 h, and most preferably at least 24 h, 48 h. or at least 10%, 50% or 100% compared to the same composition without water.

The crosslinking composition can comprise a solvent. For CO2 deblocking catalyst systems, the inventors further found that advantages can be achieved in pot life d if in the crosslinkable composition at least part of the solvent is a primary alcohol solvent. The solvent can be a mixture of a non-alcoholic solvent and an alcohol solvent. Preferably, the alcohol is present in an amount of at least 1, preferably 2, more preferably 3, most preferably at least 5, even more preferably at least 10 wt % relative to the total weight of the crosslinkable composition and in view of VOC constraints preferably at most 45, preferably at most 40 wt %, most preferably less than 30 wt %.

The alcohol solvent preferably is one or more primary alcohols, more preferably a mono-alcohol having 1 to 20, preferably 1-10, more preferably 1-6 carbon atoms, preferably selected from the group of ethanol, n-propanol, n-butanol, n-amyl alcohol and butylglycol The crosslinkable composition according to the invention comprises between 5 and 95 wt % of a component A with at least 2 acidic protons C—H in activated methylene or methine, and between 5 and 95 wt % of a component B with at least 2 activated unsaturated groups (wt % relative to the total weight of the crosslinkable composition) and a catalyst system C that contains, or is able to generate a basic catalyst capable of activating the RMA reaction between components A and B, at levels of 0.0001 and 0.5 meq/g solid components, an amount of component D present in quantities of at least 50 mole % relative to base generated by component C, and less than 30 mole % of C—H active groups from component A optionally between 0.1 and 80 wt % of solvent (preferably less than 45 wt %), preferably an organic solvent, preferably containing at least 1 wt % of a primary alcohol and preferably also containing 0.1, preferably 0.5-10 wt % water.

Considering that the crosslinkable composition is a 2K composition which is only formed shortly before the actual use, the invention also relates to a kit of parts for the manufacture of the composition according to the invention comprising a part 1 comprising components A and B and part 2 comprising component C and wherein one or more components D or optional components A2 can be included in part 1 or part 2 or both.

The invention also relates to the use of the component D, optionally in combination with component A2, as described above as an additive to RMA cross-linkable compositions for the improvement of the open time of the crosslinkable composition and for the improvement of the appearance and hardness of the resulting cured composition, in particular a coating.

The invention also relates to the use of the crosslinking composition according to the invention in a method for the manufacture of coating compositions, films or inks and to coating compositions, inks or films comprising the crosslinking composition according to the invention and further application oriented additives for example one or more coating additives like pigments, co-binder, solvents etc.

The invention also relates to the use of crosslinkable compositions as described herein for the preparation of a coating wherein preferably component D yields in said coating an increase in time to get to a 30% conversion level, of at least 3, preferably 5, more preferably 10 minutes, preferably less than 60, more preferably less than 30 minutes, when compared to the same coating without component D The foregoing more general discussion of the present invention will be further illustrated by the following specific examples, which are exemplary only.

Molecular weights were measured by GPC in THF, and expressed in polystyrene equivalent weights.

Viscosities were measured with a TA Instruments AR2000 Rheometer, using a cone and plate setup (cone 4 cm 1°) at 1 Pa stress.

Tube and Ball Method for Pot Life Determination: A flat bottomed test tube (internal diameter 15 mm, length 12.5 cm), carrying two marks, 5 cm apart is filled with 20 ml of paint. A steel ball with a diameter of 8 mm is added, and the tube is closed with a snap cap. The tube is held under an angle of 10° and the steel ball is allowed to roll on the wall of the test tube. The time needed to roll between the two marks is taken as a measure for the viscosity. The time needed to double in viscosity is taken as the pot life. If necessary this time is calculated by linear interpolation between two measurements. This method was used for the pigmented formulations. For the clear formulations, a glass test tube (length 12 cm, diameter 13 mm) was filled with a stainless steel ball of 12 mm diameter, and the formulation to be studied to leave a very limited head space, and closed. Time was recorded for the ball to fall and pass a distance of 5 cm when the tube was tilted vertically. An average was taken over 2 measurements.

Drying Recorder Drying Time: For determining the recorder drying time, paint was applied on a glass panel with a doctor blade with a 90µ gap. The drying time was measured with a Gardco electronic drying time recorder, type DT-5020, set on a cycle time of 60 minutes. Drying time was recorded as the time were the stylus left no more visible trace on the film.

TNO Cotton Ball Drying Times: Dust-dry and tack-free times were measured according to the so-called TNO method with a wad of cotton-wool. Dust-dry time means the time needed for the coating after dropping the wad on the surface of the coating and after leaving it there for 10 seconds, to get no residue of the wool-cotton sticking onto the surface after blowing away the wad. For tack-free time the same holds but now a weight load of 1 kg is applied on the wad for 10 seconds.

Persoz Hardness Measurement: Persoz pendulum hardness was measured in a climatized room at 23° C., and 55+/− 5% relative humidity. Hardness is measured with a pendulum acc. Persoz as described in ASTM D 4366. For the gradient layer thickness panels, hardness is measured at different spots and corresponding layer thickness is measured. If necessary the hardness at a certain layer thickness is calculated by linear interpolation of the measurement at two different layer thicknesses. Layer thicknesses were measured with a Fischer Permascope MP40E-S.

Optical Evaluation Spayed Pigmented Paints: Paint was sprayed with a devilbiss spraygun, nozzle FF-1.4 with an air pressure of 3.5 bar. The paint was prayed in a continuous layer over the entire surface of a 55×10 cm steel panel. A consecutive layer was sprayed starting 10 cm from the right edge. Several layers were built up, moving to the right so that a layer thickness gradient was build up from the left to right. Films were allowed to dry horizontally at 23° C., 45% RH. Layer thicknesses were measured with a Fischer Permascope MP40E-S. At 100µ layer thickness, a picture was taken with an Olympus SZX10 microscope (1× magn) equipped with a digital camera.

Wavescan Analysis: The panels as described above were analyzed using the Wavescan II of Byk instruments. Data were stored using Autochart software from Byk. Analysis was done in the direction perpendicular to the thickness gradient. In this instrument the light of small laser diode is reflected by the surface of the sample under an angle of 60°, and the reflected light is detected at the gloss angle (60° opposite). During the measurement, the "wave-scan" is moved across the sample surface over a scan length of approx. 10 cm, with a data point being recorded every 0.027 mm. The surface structure of the sample modulates the light of the laser diode.

The signal is divided into 5 wavelength ranges in the range of 0.1-30 mm and processed by mathematical filtering. For each of the 5 ranges a characteristic value (Wa 0.1-0.3 mm, Wb 0.3-1.0 mm, We 1.0-3.0 mm, Wd 3.0-10 mm, We 10-30 mm) as well as the typical wave-scan-values longwave (LW, approx. 1-10 mm) and shortwave (SW, approx. 0.3-1 mm) is calculated. Low values mean a smooth surface structure. Additionally a LED light source is installed in the wave-scan DOI and illuminates the surface under 20 degrees after passing an aperture. The scattered light is detected and a so-called dullness value (du, <0.1 mm) is measured. By using the three values of the short wave range Wa, Wb and du a DOI value is calculated. (see Osterhold e.a., Progress in Organic Coatings, 2009, vol. 65, no 4, pp. 440-443).

The following abbreviations were used for chemicals used in the experiments: DiTMPTA is di-trimethylolpropane-tetraacrylate (obtained from Aldrich (MW=466 g/mol)) or used as Sartomer SR355 (supplied commercially by Sartomer); Disperbyk 163 is a dispersant commercially supplied by Byk; Byk 310 and 315 are additives commercially supplied by ByK; Kronos 2310 is a TiO2 pigment commercially supplied by Kronos, TBAH is tetrabutylammonium hydroxide, BuAc is Butyl acetate, MEK is Methyl ethyl ketone (2-Butanone); EtAcAc is ethyl acetoacetate; DEC is diethyl carbonate; IPA is isopropanol; RT is room temperature.

Preparation of Malonate Polyester A

Into a reactor provided with a distilling column filed with Raschig rings were brought 17.31 mol of neopentyl glycol, 8.03 mol of hexahydrophthalic anhydride and 0.0047 mol of butyl stannoic acid. The mixture was polymerised at 240° C. under nitrogen to an acid value of 0.2 mg KOH/g. The mixture was cooled down to 130° C. and 10.44 mol of diethylmalonate was added. The reaction mixture was heated to 170° C. and ethanol was removed under reduced pressure. The nearly colourless material was cooled down and diluted with 420 g of butyl acetate to a 90% solid content. The final resin had an acid value of 0.3 mg KOH/g solids, an OH value of 20 mg KOH/g solids and a weight average molecular weight of 3400 Da.

Catalyst Solution C

Catalyst solution was prepared by reacting 59.4 g a TBAH solution (40% in water) with 13.5 g DEC (reacting overnight at RT), with 14.5 g isopropanol as co-solvent, following the corresponding ethocarbonate species development. Titration indicated that blocking was complete, and that the concentration of blocked base was 0.83 meq/g solution.

Catalyst Solution C2

To 43.6 g of a 45% aqueous solution of TBAH were added 36.6 g of isopropanol and 60 g of DEC. After standing overnight the mixture was filtered over paper. Titration showed that the catalyst contained 0.52 meq of blocked base per gram solution.

Catalyst Solution C3

Catalyst solution C3 was prepared by reacting 39.9 g a TBAH solution (40% in methanol) with 8.6 g DMC and additional 6.5 g methanol (reacting overnight at RT). The slight hazy solution was filtrated over a folded paper filter resulting in a clear solution. Titration indicated that blocking was complete, and that the concentration of blocked base was 1.14 meq/g solution.

Comparative Example Formulation 1, Example Formulations 1-4

Formulations were prepared based on a malonate donor resin A, DiTMPTA as acryloyl donor resin, and the indicated amount of succinimide, and thinned to a viscosity of 160 mPas with a mixture of MEK/BuAc 1:1 by volume. This was mixed with an amount of catalyst solution C1. Listed in table A are the details of the overall composition. Catalyst amounts are 50 µeq/g solids, water levels are 1.8 wt %, isopropanol at 0.7 wt %, ethanol level estimated at 0.2 wt %.

TABLE A

| Code | Comp1 | Ex1 | Ex2 | Ex 3 | Ex4 |
|---|---|---|---|---|---|
| malonate ester A/g | 15.0 | 15.0 | 15.0 | 15.0 | 15.0 |
| di-TMPTA/g | 6.6 | 6.6 | 6.6 | 6.6 | 6.6 |
| succinimide/mg | 0 | 149 | 174 | 199 | 298 |
| mole % succinimide on cat | 0 | 150 | 175 | 200 | 300 |
| MEK/BuAc (1:1)/g | 4.5 | 4.5 | 4.5 | 4.5 | 4.5 |
| catalyst C1/g | 1.2 | 1.2 | 1.2 | 1.2 | 1.2 |

Of these formulations, the drying behaviour at room temperature for films leading to a dry film thickness of around 70-75 mu was followed with TNO cotton ball drying tests, and Persoz pendulum hardness development was determined; also these results are listed in Table B.

TABLE B

| Code | Comp1 | Ex1 | Ex2 | Ex3 | Ex4 |
|---|---|---|---|---|---|
| mole % succinimide on cat | 0 | 150 | 175 | 200 | 300 |
| TNO-drying | | | | | |
| dust-dry (min) | 10' | 25' | 25' | 30' | 65' |
| tack-free (min) | 10' | 30' | 30' | 35' | 70' |
| Persoz hardness (sec) after time at RT: | | | | | |
| 4 h | 31 | | | 107 | 132 |
| 1 night | 42 | | | 126 | 152 |
| 1 week | 66 | 131 | 137 | 146 | 231 |

It can be seen that whereas comparative example 1 shows an extremely fast drying, the actual Persoz hardness levels are low presumably due to solvent entrapment in the system. Moreover, the appearance of this comparative example 1 is poor. Upon addition of low levels of succinimide (slightly higher than the levels of catalyst used), some retardation of the drying is seen, but still giving drying times considered as fast; however, it can also be observed that the Persoz hardness development is strongly improved. Simultaneously, the example films with succinimide exhibit a better appearance than comparative example 1.

Example formulations 5-7, and comparative example formulations 2-3 were prepared as pigmented paints, having compositions as tabulated in Table C (amounts in grams).

TABLE C

| Code | Ex5 | Ex6 | Ex7 | Comp2 | Comp3 |
|---|---|---|---|---|---|
| Sartomer SR355 | 38.19 | 38.19 | 38.19 | 38.19 | 39.19 |
| Disperbyk 163 | 2.39 | 2.39 | 2.39 | 2.39 | 2.39 |
| Kronos 2310 | 80.12 | 80.12 | 80.12 | 80.12 | 80.12 |
| malonate polyester A | 58.70 | 67.69 | 67.69 | 58.70 | 67.69 |
| Sartomer SR 355 | 4.22 | 1.15 | 1.15 | 4.22 | 4.22 |
| EtAcAc | 4.81 | 0.00 | 0.00 | 4.81 | 0.00 |
| Byk 310/315 [1:4 by mass] | 0.60 | 0.60 | 0.60 | 0.60 | 0.60 |
| succinimide | 0.79 | 0.79 | 1.58 | 0.00 | 0.00 |
| BuAc | 2.52 | 2.52 | 2.52 | 2.52 | 2.52 |
| MEK | 7.20 | 7.20 | 7.20 | 7.20 | 7.20 |
| catalyst solution C2 | 9.34 | 9.34 | 9.34 | 9.34 | 9.34 |

TABLE C-continued

| Code | Ex5 | Ex6 | Ex7 | Comp2 | Comp3 |
|---|---|---|---|---|---|
| recorder drying time (min) | 14 | 15 | 44 | 4.3 | 8 |
| potlife (min) | 39 | 35 | 37 | 17 | 29 |
| Persoz hardness (sec) after 24 h (50 mu dry film) | 147 | 147 | 145 | 85 | 66 |

Pot life of these pigmented paints were measured, and drying times of these paints drawn onto glass panels were determined with a drying recorder. These paints were also applied by spraying onto a steel panel to obtain gradient film thickness panel. Persoz hardness at 50 mu dry film thickness was determined after 24 hr RT cure; microscope pictures were taken of the resulting coatings on these panels at approximately 100 mu dry film thickness (Appendix: Photographs). Also, pot life of these paints were measured. Results are included in table C.

It can be observed from a comparison of comparative example 3 with examples 6 and 7, that the addition of succinimide to the formulation gives clear advantages in Persoz hardness build-up, and some advantage in pot life. Example 7, with a higher level of succinimide, shows a significant increase in drying time, the 44 minute value can however still be considered as an acceptable to good value. Appearance of panels from examples 6 and 7 is much better than that of panels from comparative example 3, as can be judged from comparing the microscope photographs, comparative example 3 showing many more defects (Appendix: Photographs).

Similar conclusions can be drawn from a comparison of comparative example 2, with example 5, now based on a formulation with acetoacetate included besides malonate as RMA donor groups. Example 5 (with succinimide added) exhibits higher Persoz hardness, a better pot life, and a better appearance (Appendix: Photographs) than comparative example 2 (not containing succinimide).

Example 8 was prepared and evaluated in a similar way as discussed above for example 5-7, the composition and results given below in table D (amounts in grams). It can be seen that the additional presence of 1,2,4-triazole (when compared to example 6) leads to a significant improvement in pot-life, other advantages being retained.

TABLE D

| Code | Ex8 |
|---|---|
| Sartomer SR355 | 38.19 |
| Disperbyk 163 | 2.39 |
| Kronos 2310 | 80.12 |
| Malonate polyester A | 67.69 |
| Sartomer SR 355 | 1.15 |
| EtAcAc | 0.00 |
| Byk 310/315 [1:4 by mass] | 0.60 |
| 1,2,4-triazole | 0.96 |
| Succinimide (s) | 0.79 |
| BuAc | 2.52 |
| MEK | 7.20 |
| catalyst solution C2 | 9.34 |
| recorder drying time (min) | 16 |
| Potlife (min) | 70 |
| Persoz hardness (sec) after 24 h (50 mu dry film) | 147 |

Example formulations 9 and 10, and comparative example formulations 4 and 5 were formulated and evaluated along similar lines, now also including Wavescan analysis to have a quantitative indication of the quality of the appearance. Compositions and results are given in Table E (amounts in grams).

TABLE E

| Code | Ex9 | Ex10 | Comp4 | Comp5 |
|---|---|---|---|---|
| Sartomer | 19.07 | 19.07 | 19.07 | 19.07 |
| Disperbyk 163 | 1.19 | 1.19 | 1.19 | 1.19 |
| Kronos 2310 | 40.01 | 40.01 | 40.01 | 40.01 |
| Malonate polyester A | 29.35 | 33.85 | 29.35 | 33.85 |
| Sartomer SR 355 | 2.11 | 0.58 | 2.11 | 0.58 |
| EtAcAc | 2.41 | — | 2.41 | — |
| Byk 310/315 [1:4 by mass] | 0.30 | 0.30 | 0.30 | 0.30 |
| Succinimide | 0.40 | 0.40 | — | — |
| BuAc | 1.26 | 1.26 | 1.26 | 1.26 |
| MEK | 3.60 | 3.60 | 3.60 | 3.60 |
| Catalyst solution C2 | 4.67 | 4.67 | 4.67 | 4.67 |
| Persoz hardness (s) at 50μ | 122 | 125 | 97 | 93 |
| Layer thickness (μ) | 51 | 56 | 58 | 58 |
| du (dullness) | 6.30 | 6.40 | 8.80 | 11.30 |
| Longwave | 3.80 | 1.90 | 5.30 | 7.80 |
| Shortwave | 2.20 | 6.40 | 18.20 | 24.10 |
| DOI (Dorigon) | 94.10 | 93.90 | 91.50 | 88.40 |
| Layer thickness (μ) | 92 | 93 | 92 | 86 |
| du (dullness) | 5.90 | 8.70 | 11.60 | 23.40 |
| Longwave | 1.00 | 3.70 | 11.50 | 25.10 |
| Shortwave | 9.50 | 24.90 | 29.70 | 60.60 |
| DOI (Dorigon) | 94.10 | 90.20 | 88.10 | 74.90 |

Example formulation 9 can be compared with comparative formulation example 4, example formulation 10 can be compared with comparative formulation example 5, difference being the presence of low amounts of succinimide. It can from both comparisons be concluded that the presence of succinimide, besides the improved Persoz hardness, leads to significantly improved values for longwave and shortwave roughness, dullness and DOI.

Example 11

Impact on Conversion Kinetics

The conversion of the acryloyls in the system can be followed by FTIR, focusing on the 809 cm$^{-1}$ band characteristic of the acryloyl. Doing that, the impact of added succinimide on total conversion can be made visible. Two systems were formulated (according to compositions of comparative example 1 (without succinimide) and example formulation 1 (with 150% succinimide relative to solids). FIG. 1 compares the conversion of these systems after application on top of an ATR crystal, the IR beam probing the deepest layers, close to the substrate. Initial conversion of the formulation without the succinimide is fast, which is also the cause for solvent entrapment and potential appearance problems. It can be seen that the addition of succinimide, even at these very low levels, leads to a significant retardation of the initial conversion; simultaneously, it illustrates that after this initial retardation period, the conversion rate is accelerating, so that the rate of cure towards higher conversions is still fast after this initial delay.

Example 12

Determination of Michael Addition Reactivity of Succinimide 5 grams of succinimide (50.5 mmole) were dissolved in a mixture of 42 grams of butyl acrylate and 42 grams of methanol, and maintained at room temperature as such, or after adding a strong base (9.82 grams of a 1.12 meq/g solution of tetrabutylammonium hydroxide in methanol, 11 meq). Subsequently, the concentration of succinimide is determined as a function of time by taking samples, neutralizing with a known excess of HCl in water, and backtitration with a KOH solution. Without base initiation, no significant loss of succinimide N—H in this solution is observed in two weeks. With the base added, the succinimide concentration can be seen to decrease with time, as illustrated in the table F below. Succinimide concentration is expressed as % relative to the theoretical level based on used amounts.

TABLE F

| Time (min) | Succinimide remaining (%) |
|---|---|
| 3 | 99 |
| 30 | 87 |
| 60 | 77 |
| 120 | 60 |
| 180 | 48 |

At this catalyst level ([succinimide]/[base]=5), it takes about an hour to lose 25% of the succinimide acidic protons to be consumed.

Using the same method, also the reactivity for various other components was determined; as a reference a similar set-up was used for the reactivity of dimethylmalonate under these conditions (only in this case, the remaining DMM level was determined with GC). Table G lists the results of the relative Michael addition reactivities, expressed as a number indicating the initial increase in % conversion, per minute, under these conditions. It can be seen that in all cases, this initrinsic reactivity is significantly lower than of a malonate, but still present.

TABLE G

| Relative conversion rates | |
|---|---|
| dimethylmalonate | 42 |
| succinimide | 0.33 |
| benzotriazole | 0.29 |
| 1,2,4 triazole | 0.91 |
| 5,5-dimethylhydantoin | 0.03 |
| benzenesulfonamide | 0.11 |

Example 13

In Table H, additional results are listed that illustrate the beneficial effect on hardness build-up of various compositions according to the invention.

Formulations were prepared of 15 g of malonate polyester A, 6.1 g of DTMPTA, 1.5 g of n-propanol, 0.84 g of catalyst solution C-3 (1.14 meq base/g, 50 µeq/g solids in formulation), and an amount of X—H component given in table 103 below; the films were applied by drawn down on glass with dry film thickness of ca. 60 mu, or 80 mu, and Persoz hardness (sec) was determined after 1, 7 and 28 days at RT: the results are shown in table H. The beneficial impact on hardness build-up in the examples according to the invention is illustrated.

TABLE H

| example | additive | amount (mg) | % on base | dlt (mu) | PH (1 d) | PH (7 d) | pH (28 d) |
|---|---|---|---|---|---|---|---|
| comparative | none | | | 64 | 52 | 89 | 132 |
| A | 1,2,4 | | | 84 | 31 | 63 | 98 |
| | triazole | 131 | 200% | 53 | 69 | 98 | 160 |
| | | | | 81 | 50 | 69 | 123 |
| | | 65 | 100% | 48 | 72 | 117 | 180 |
| | | | | 79 | 33 | 65 | 106 |
| B | ethosuximide | 267 | 200% | 46 | 146 | 203 | 249 |
| | | | | 67 | 116 | 151 | 196 |
| | | 135 | 100% | 51 | 107 | 141 | 225 |
| | | | | 84 | 66 | 113 | 153 |
| C | isatine | 278 | 200% | 50 | 88 | 131 | 170 |
| | | | | 80 | 64 | 88 | 125 |
| | | 140 | 100% | 50 | 67 | 119 | 155 |
| | | | | 82 | 46 | 85 | 119 |
| D | succinimide | 187 | 200% | 58 | 117 | 138 | 190 |
| | | | | 77 | 90 | 112 | 149 |
| | | 93 | 100% | 66 | 72 | 98 | 128 |
| | | | | 82 | 61 | 98 | 131 |
| E | 55-DMH | 242 | 200% | 65 | 92 | 105 | 142 |
| | | | | 87 | 72 | 81 | 113 |
| | | 121 | 100% | 58 | 92 | 100 | 135 |
| | | | | 72 | 87 | 97 | 121 |
| F | benzene | 297 | 200% | 55 | 93 | 122 | 161 |
| | sulfonamide | | | 81 | 52 | 76 | 106 |
| | | 148 | 100% | 63 | 71 | 97 | 148 |
| | | | | 83 | 65 | 75 | 123 |
| G | benzotriazol + | 112 + 102 | 100 + 100% | 69 | 71 | X | 129 |
| | succinimide | | | 85 | 42 | X | 121 |
| H | nitromethane | 120 | 200% | 60 | x | 126 | X |
| | | | | 80 | X | 102 | x |
| I | phenol | 179 | 200% | 55 | x | 160 | X |
| | | | | 80 | X | 127 | x |

Example 14

Formulations were prepared with components as indicated in table 104. Persoz hardness one day after application (spraying onto bonder panels) at RT is given. Typical layer thicknesses were 60-80 mu. The hardness value of the comparative example without N—H components was 64 sec. It can be seen that the use of succinimide, ethosuximide, isatine and 2-methyl-4-nitroimidazole is favourable for the hardness build-up. Thinner used was a 1:1 (by weight) mixture of butylacetate and MEK; catalyst solution was prepared similar to C-1, and had a concentration of 0.7 meq base/g. Results and compositions are listed in table I.

TABLE I

| Example | | A | B | C | D | E | F | G | H |
|---|---|---|---|---|---|---|---|---|---|
| Sartomer SR355 | | 8.43 | 8.43 | 8.41 | 8.30 | 8.39 | 8.39 | 8.43 | 8.43 |
| Disperbyk 163 | | 0.53 | 0.53 | 0.53 | 0.52 | 0.53 | 0.53 | 0.53 | 0.53 |
| Kronos 2310 | | 17.68 | 17.68 | 17.64 | 17.41 | 17.59 | 17.60 | 17.68 | 17.68 |
| Malonate PE A | | 14.73 | 14.73 | 14.70 | 14.51 | 14.65 | 14.67 | 14.73 | 14.73 |
| Sartomer SR355 | | 0.63 | 0.63 | 0.63 | 0.62 | 0.62 | 0.62 | 0.63 | 0.63 |
| EtAcAc | | 0.51 | 0.51 | 0.51 | 0.51 | 0.51 | 0.51 | 0.51 | 0.51 |
| Byk 310/315 [1:4] | | 0.13 | 0.13 | 0.13 | 0.13 | 0.13 | 0.13 | 0.13 | 0.13 |
| EtOH | | 1.21 | 1.21 | 1.21 | 1.21 | 0.00 | 1.04 | 1.21 | 1.21 |
| BuAc | | 0.00 | 0.56 | 0.56 | 0.56 | 0.56 | 0.56 | 0.00 | 0.56 |
| MEK | | 0.00 | 1.59 | 1.58 | 1.56 | 1.58 | 1.58 | 0.00 | 1.59 |
| Thinner | | 0.20 | 1.34 | 0.90 | 0.26 | 1.55 | 0.00 | 0.20 | 1.34 |
| succinimide | (5% in MEK) | 4.37 | | | | | | | |
| succinimide | (20% in DMSO) | | 1.09 | 1.64 | | | | | |
| Isatin | (16.7% in DMSO) | | | | 2.88 | | | | |
| Ethosuximide | (20% in ethanol) | | | | | 2.33 | | | |
| 2-Me-4-NO2-imidazole | (13.3% in DMSO) | | | | | | 2.79 | | |
| succinimide | (5% in mek) | | | | | | | 4.37 | |
| succinimide | (20% in DMSO) | | | | | | | | 1.09 |
| catalyst solution | (0.7 meq/g) | 1.58 | 1.58 | 1.57 | 1.55 | 1.57 | 1.57 | 1.58 | 1.58 |
| Persoz hardness | (sec) | | 99 | 110 | 84 | 169 | 110 | 147 | 107 |
| (duplo) | | 147 | 100 | 108 | 87 | 171 | 110 | 147 | 110 |

Example 15

Formulations were prepared, spray-applied to bonder panels and dried at RT. The appearance of the panels was analyzed with a Byk Wavescan instrument. Pendulum hardness (in sec, after 1 day), and longwave/shortwave numbers (lower is better) are reported in Table J, along with composition data. The advantageous effect of the formulations according to the invention on hardness and appearance can be seen. The catalyst solution was the as in example 14; thinner used was a 1:1 (by wt) mixture of butylacetate and MEK.

Further modifications in addition to those described above may be made to the structures and techniques described herein without departing from the spirit and scope of the invention. Accordingly, although specific embodiments have been described, these are examples only and are not limiting upon the scope of the invention.

TABLE J (example 15)

| example | COMP | A | B | C | D | E | F | G | H | I |
|---|---|---|---|---|---|---|---|---|---|---|
| Sartomer SR355 | 177.0 | 176.6 | 177.9 | 179.2 | 178.8 | 178.0 | 177.3 | 178.0 | 178.0 | 178.0 |
| Disperbyk 163 | 11.1 | 11.1 | 11.1 | 11.2 | 11.2 | 11.1 | 11.1 | 11.2 | 11.2 | 11.2 |
| Kronos 2310 | 371.0 | 370.3 | 373.1 | 375.8 | 374.9 | 373.3 | 371.8 | 375.0 | 375.0 | 375.0 |
| Malonate PE A | 298.0 | 297.3 | 299.5 | 309.1 | 308.4 | 307.1 | 305.8 | 309.0 | 308.0 | 308.0 |
| Sartomer SR355 | 17.0 | 16.9 | 17.1 | 5.9 | 5.9 | 5.9 | 5.9 | 5.9 | 5.9 | 5.9 |
| EtAcAc | 16.5 | 16.5 | 16.6 | 0.0 | 0.0 | 0.0 | 0.0 | 0.0 | 0.0 | 0.0 |
| Byk 310/315 [1:4] | 2.8 | 2.8 | 2.8 | 3.1 | 3.1 | 3.1 | 3.1 | 3.1 | 3.1 | 3.1 |
| Succinimide | 0.0 | 4.3 | 4.4 | 4.4 | 4.4 | 4.4 | 4.4 | 4.4 | 0.0 | 0.0 |
| Benzotriazole | 0.0 | 7.5 | 0.0 | 2.3 | 4.6 | 8.9 | 13.0 | 0.0 | 2.3 | 4.6 |
| MEK | 33.0 | 33.3 | 33.5 | 37.5 | 37.4 | 37.2 | 37.1 | 37.5 | 37.4 | 37.4 |
| BuAc | 11.7 | 11.7 | 11.7 | 13.1 | 13.1 | 13.0 | 13.0 | 13.1 | 13.1 | 13.1 |
| PrOH | 5.6 | 5.5 | 5.6 | 6.2 | 6.2 | 6.2 | 6.2 | 6.2 | 6.2 | 6.2 |
| Thinner | 46.2 | 46.2 | 46.6 | 52.0 | 51.9 | 51.7 | 51.5 | 52.0 | 52.0 | 52.0 |

TABLE J-continued (example 15)

| example | | COMP | A | B | C | D | E | F | G | H | I |
|---|---|---|---|---|---|---|---|---|---|---|---|
| Catalyst solution (0.7 meq/g) | | 25.0 | 24.9 | 25.1 | 24.1 | 24.1 | 24.0 | 23.9 | 24.1 | 24.1 | 24.1 |
| layer thickness (μm) | | 75.0 | 74.6 | 75.4 | 70.0 | 75.4 | 76.2 | 77.2 | 75.0 | 75.0 | 75.0 |
| | hardness Persoz | 50.0 | 134.0 | 132.0 | 136.0 | 132.0 | 129.0 | 122.0 | 112.0 | 120.0 | 132.0 |
| | Longwave | 17.0 | 1.2 | 1.7 | 1.9 | 1.4 | 1.1 | 1.1 | 13.5 | 11.0 | 7.0 |
| | Shortwave | 35.0 | 8.6 | 12.2 | 13.0 | 11.9 | 8.7 | 7.4 | 7.4 | 19.0 | 12.0 |
| layer thickness (μm) | | | 143.0 | 150.0 | 136.0 | 150.0 | 150.0 | 144.0 | | | |
| | hardness Persoz | | 79.0 | 62.0 | 79.0 | 71.0 | 72.0 | 79.0 | | | |
| | Longwave | | 1.1 | 1.1 | 1.1 | 0.9 | 0.7 | 0.6 | | | |
| | Shortwave | | 6.5 | 9.5 | 9.9 | 8.1 | 6.4 | 6.2 | | | |

What is claimed:

1. A crosslinkable composition comprising
   a. a component A with at least 2 RMA donor groups being acidic protons C—H in activated methylene or methine groups, and
   b. a component B with at least 2 RMA acceptor groups being activated unsaturated groups, and
   c. a catalyst system C that contains, or is able to generate, a basic catalyst capable of activating the RMA reaction between components A and B,
   d. wherein the cross-linkable composition further comprises an X—H group containing component D that is also a RMA addition donor reactable with component B under the action of catalyst C, wherein X is N, P, O, S, or wherein X is C as part of an acidic methyl group, wherein component A is malonate or acetoacetate, and wherein the X—H group of component D has a higher acidity than the C—H groups in component A, wherein component D has a pKa, defined in aqueous environment, of at least one unit less than that of the C—H groups in component A.

2. The crosslinkable composition according to claim 1, in which the RMA acceptor groups in component B are acryloyl groups.

3. The crosslinkable composition according to claim 1, in which the RMA donor groups in component A originate predominantly from malonate groups.

4. The crosslinkable composition according to claim 3, wherein more than 50% of the components A are malonate groups.

5. The crosslinkable composition according to claim 1, wherein the X—H group of component D has a pKa, defined in aqueous environment, of at least two units less than that of the C—H groups in component A.

6. The crosslinkable composition according to claim 1, wherein the pKa of the X—H group in component D is lower than 13.

7. The crosslinkable composition according to claim 1, wherein X—H groups in component D are present in an amount corresponding to at least 50 mole % relative to the amount of base to be generated by catalyst C, and wherein X—H groups in component D are present in an amount corresponding to no more than 30 mole % relative to C—H donor groups from component A.

8. The crosslinkable composition according to claim 1, wherein in X—H group containing component D the X is C as part of an acidic methyl $CH_3$ group, a nitromethane, or wherein the X is O.

9. The crosslinkable composition according to claim 1, wherein component D is an aza-acidic compound comprising a molecule containing the N—H as part of a group Ar—NH—(C=O), —(C=O)—NH—(C=O)—, or of a group —NH—(O=S=O)— or a heterocycle in which the nitrogen of the N—H group is contained in a heterocyclic ring.

10. The crosslinkable composition according to claim 8, wherein component D is an imide derivative, a cyclic imide derivative, succinimide or glutarimide, or wherein component D is a hydantoin derivative, 5,5-dimethylhydrantoin, or wherein component D is a sulfonamide, an aromatic sulfonamide, benzene- or toluenesulfonamide, or wherein component D is a N—H group containing heterocycle, a substituted or unsubstituted triazole, pyrazole or imidazole.

11. The crosslinkable composition according to claim 8, wherein component D is 1,2,4-triazole, benzotriazole or 2-methyl-4-nitroimidazole.

12. The crosslinkable composition according to claim 1, wherein the crosslinking composition further comprises a component A2 comprising C—H acidic protons in activated methylene or methine groups having a higher acidity than component A and which is also RMA reactive towards component B.

13. The crosslinkable composition according to claim 12, wherein A2 is acetoacetate or acetylacetone.

14. The crosslinkable composition according to claim 12 wherein C—H groups in component A2 are present in an amount between 1 and 50 mol % relative to total C—H in RMA donor A.

15. The crosslinkable composition according to claim 1 comprising
   a. one or more components selected from the group of substituted or unsubstituted triazoles and of components A2, and additionally
   b. one or more components selected from the group of non-triazole components D, N—H acidic compounds.

16. The crosslinkable composition according to claim 15, wherein
   a. the one or more components selected from the group of substituted or unsubstituted triazoles and of components A2 is benzotriazole, acetoacetate or acetylacetone, and additionally
   b. the one or more components selected from the group of non-triazole components D is N—H acidic compounds.

17. The crosslinkable composition according to claim 15 comprising
   a. one or more components selected from the group of substituted or unsubstituted triazoles and b. one or more components A2, and additionally
c. one or more components selected from the group of non-triazole components D.

18. The crosslinkable composition according to claim 1 comprising
a. between 5 and 95 wt % of a component A with at least 2 acidic protons C—H in activated methylene or methine, and
b. between 5 and 95 wt % of a component B with at least 2 activated unsaturated groups, wt % relative to the total weight of the crosslinkable composition, and
c. a catalyst system C that contains, or is able to generate a basic catalyst capable of activating the RMA reaction between components A and B, at levels of 0.0001 and 0.5 meq/g solid components,
d. an amount of component D present in quantities of at least 50 mole % relative to base generated by component C, and less than 30 mole % of C—H active groups from component A,
e. between 0.1 and 80 wt % of solvent.

19. The crosslinkable composition according to claim 18, wherein the solvent is an organic solvent containing at least 1wt % of a primary alcohol.

20. The crosslinkable composition according to claim 18, further containing 0.1wt % water.

21. A kit of parts for the manufacture of the composition according to claim 1 comprising a part 1 comprising components A and B and part 2 comprising component C and wherein one or more components D or components A2 can be included in part 1 or part 2 or both.

22. An RMA coating additive mixture comprising
a. one or more components selected from the group of components A2 comprising C—H acidic protons in activated methylene or methine groups, and of substituted or unsubstituted triazoles components, and additionally
b. one or more components selected from the group of non-triazole X—H group containing components D wherein X is N, P, O or S or wherein X is C as part of an acidic methyl $CH_3$ group.

23. The RMA coating additive mixture according to claim 22, wherein
a. the one or more components selected from the group of components A2 is acetoacetate or acetylacetone, triazole or benzotriazole, and
b. the one or more components selected from the group of non-triazole is succinimide.

24. The RMA coating additive mixture according to claim 22 comprising
a. one or more components A2, and additionally
b. one or more components selected from the group of substituted or unsubstituted triazoles, and
c. one or more components selected from the group of non-triazole components D.

25. The RMA coating additive mixture according to claim 23, wherein
a. the one or more components A2 is acetoacetate or acetylacetone, and
b. the one or more components selected from the group of substituted or unsubstituted triazoles is benzotriazole or triazole.

26. The RMA coating additive mixture according to claim 22, wherein the pKa of the X—H group in component D is between 7 and 13.

27. Method for the improvement of the appearance and hardness of a cured coating, comprising providing a crosslinkable composition comprising:
a. a component A with at least 2 RMA donor groups being acidic protons C—H in activated methylene or methine groups, and
b. a component B with at least 2 RMA acceptor groups being activated unsaturated groups, and
c. a catalyst system C that contains, or is able to generate a basic catalyst capable of activating the RMA reaction between components A and B,
d. wherein the cross-linkable composition further comprises an X—H group containing component D that is also a Michael addition donor reactable with component B under the action of catalyst C, wherein X is N, P, O, S or wherein X is C as part of an acidic methyl group, wherein component A is malonate or acetoacetate, and wherein the X—H group of component D has a higher acidity than the C—H groups in component A, wherein component D has a pKa, defined in aqueous environment, of at least one unit less than that of the C—H groups in component A,
  alone or in combination with component A2 comprising C—H acidic protons in activated methylene or methine groups having a higher acidity than component A and which is also RMA reactive towards component B, or in combination with an RMA coating additive mixture comprising
a. one or more components selected from the group of components A2 comprising C—H acidic protons in activated methylene or methine groups, and of substituted or unsubstituted triazoles components, and additionally
b. one or more components selected from the group of non-triazole X—H group containing components D wherein X is N, P, O or S or wherein X is C as part of an acidic methyl $CH_3$ group.

28. Method for the manufacture of coating compositions, films or inks comprising: providing the crosslinking composition according to claim 22.

29. Coating composition comprising the crosslinkable composition according to claim 1, and further comprising one or more coating additives, co-binder, or solvents.

* * * * *